(12) United States Patent
Al-Dahhan et al.

(10) Patent No.: US 9,545,829 B2
(45) Date of Patent: Jan. 17, 2017

(54) DUAL-RATE JOUNCE BUMPER

(71) Applicant: BASF SE, Ludwigshafen (DE)

(72) Inventors: Sadiq Al-Dahhan, Dearborn, MI (US); Stefan Dubenhorst, Lemfoerde (DE); Stefan Haupt, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/772,189

(22) PCT Filed: Mar. 5, 2014

(86) PCT No.: PCT/US2014/020590
§ 371 (c)(1),
(2) Date: Sep. 2, 2015

(87) PCT Pub. No.: WO2014/164104
PCT Pub. Date: Oct. 9, 2014

(65) Prior Publication Data
US 2016/0009157 A1    Jan. 14, 2016

Related U.S. Application Data

(60) Provisional application No. 61/780,212, filed on Mar. 13, 2013.

(51) Int. Cl.
*B60G 11/22* (2006.01)
*F16F 9/58* (2006.01)
(Continued)

(52) U.S. Cl.
CPC .............. *B60G 11/22* (2013.01); *B60G 15/06* (2013.01); *F16F 1/3713* (2013.01); *F16F 9/58* (2013.01);
(Continued)

(58) Field of Classification Search
CPC .......... F16F 1/3713; F16F 1/3732; F16F 9/58; B60G 11/22; B60G 15/06; B60G 2204/4502; B60G 2204/45021
See application file for complete search history.

(56) References Cited

U.S. PATENT DOCUMENTS 1,969,266 A * 8/1934 Herold ................ F16F 1/3713
16/42 R
3,081,993 A * 3/1963 Wallerstein, Jr. ..... F16F 1/3713
267/292
(Continued)

FOREIGN PATENT DOCUMENTS

DE   201 09 932 U1   10/2001
DE   202 04 328 U1    6/2002
(Continued)

OTHER PUBLICATIONS

International Search Report for Application No: PCT/US2014/020590 dated Jun. 10, 2014, 4 pages.
(Continued)

*Primary Examiner* — Drew Brown
(74) *Attorney, Agent, or Firm* — Howard & Howard Attorneys PLLC

(57) ABSTRACT

A dual-rate jounce bumper limits jounce travel between a first component and a second component of a vehicle. The second component is spaced from and moveable toward the first component along a jounce axis. The dual-rate jounce bumper includes a bumper and an outer member. The bumper has a first end for coupling to the first component and a second end spaced from the first end for contacting the second component as the second component moves along the jounce axis toward the first component. The bumper is compressible between the first and second components for limiting jounce travel. The bumper is also radially expandable as the bumper is compressed. The outer member is disposed about the bumper and is capable of limiting the (Continued)

radial expansion of the bumper as the bumper is compressed for increasing a stiffness of the bumper.

20 Claims, 4 Drawing Sheets

(51) Int. Cl.
  *F16F 1/371* (2006.01)
  *B60G 15/06* (2006.01)
(52) U.S. Cl.
  CPC .................. *B60G 2204/4502* (2013.01); *B60G 2204/45021* (2013.01)

(56) References Cited

U.S. PATENT DOCUMENTS

| | | | | |
|---|---|---|---|---|
| 3,118,659 | A | * | 1/1964 | Paulsen .................. B60G 7/04 267/140.4 |
| 2005/0230891 | A1 | * | 10/2005 | Griffin .................... B60G 7/04 267/292 |

FOREIGN PATENT DOCUMENTS

| | | |
|---|---|---|
| DE | 101 24 924 A1 | 11/2002 |
| DE | 101 57 325 A1 | 6/2003 |
| DE | 20 2004 003 831 U1 | 5/2004 |
| DE | 20 2005 012 531 U1 | 10/2005 |
| DE | 10 2011 116 899 A1 | 4/2012 |
| EP | 1 640 634 A1 | 3/2006 |

OTHER PUBLICATIONS

Machine-assisted English translation for DE 201 09 932 extracted from espacenet.com database on Sep. 28 2015, 27 pages.
Machine-assisted English translation for DE 202 04 328 extracted from espacenet.com database on Sep. 28, 2015, 27 pages.
English language abstract and machine-assisted English translation for DE 101 24 924 extracted from espacenet.com database on Sep. 28, 2015, 24 pages.
English language abstract and machine-assisted English translation for DE 101 57 325 extracted from espacenet.com database on Sep. 28, 2015, 25 pages.
English language abstract and machine-assisted English translation for DE 20 2004 003 831 extracted from espacenet.com database on Sep. 28, 2015, 10 pages.
English language abstract and machine-assisted English translation for DE 20 2005 012 531 extracted from espacenet.com database on Sep. 28, 2015, 9 pages.
English language abstract and machine-assisted English translation for DE 10 2011 116 899 extracted from espacenet.com database on Sep. 28, 2015, 17 pages.
English language abstract and machine-assisted English translation for EP 1 640 634 extracted from espacenet.com latabase on Sep. 28, 2015, 18 pages.

* cited by examiner

US 9,545,829 B2

DUAL-RATE JOUNCE BUMPER

RELATED APPLICATIONS

This application is the National Stage of International Patent Application No. PCT/US2014/020590, filed on Mar. 5, 2014, which claims priority to and all advantages of U.S. Patent Application No. 61/780,212, which was filed on Mar. 13, 2013, the content of which is incorporated herein by reference.

FIELD OF THE INVENTION

The present invention generally relates to a dual-rate jounce bumper for use in a vehicle.

BACKGROUND OF THE INVENTION

Jounce bumpers are used in a suspension system of a vehicle to limit transmission of an impact force to a frame member of the vehicle. For example, when the vehicle travels over a bump, components of the suspension system, such as a strut assembly, jounce or collapse to absorb the energy generated by the impact. However, when the suspension system cannot completely dissipate the energy, the components of the suspension system may impact the frame assembly thereby transmitting the impact force to the frame member, which is not desirable.

Generally, the jounce bumpers gradually stiffen the suspension systems as the suspension system approaches an end of its jounce travel, i.e., before the components of the suspension system impact the frame of the vehicle. As such, a conventional jounce bumper is used to separate components of the suspension system and the frame member of the vehicle to prevent the suspension system from directly impacting the frame member. For example, the conventional jounce bumper may be coupled to a piston rod of a strut assembly of the suspension system between a cylinder of the strut assembly and the frame of the vehicle. The conventional jounce bumper separates the cylinder of the strut assembly and the frame member of the vehicle to prevent the cylinder from directly impacting the frame member as the strut assembly approaches the end of its jounce travel.

The conventional jounce bumper includes a disk-shaped bumper. As the disk-shaped bumper is compressed, the resistance to compression increases to the point the disk-shaped bumper acts like a solid. The compression of the disk-shaped bumper absorbs energy transferred from the suspension system. However, once the disk-shaped bumper acts like a solid, any remaining energy in the suspension system is transferred directly to the frame member of the vehicle. Often, the impact force is greater than the jounce bumper can handle. Therefore, there remains a need to provide an improved jounce bumper.

SUMMARY OF THE INVENTION AND ADVANTAGES

A dual-rate jounce bumper assembly limits jounce between a first component and a second component of a vehicle. The second component is spaced from and moveable toward the first component along a jounce axis. The dual-rate jounce bumper assembly includes a bumper and an outer member. The bumper has a first end for coupling to the first component and a second end spaced from the first end for contacting the second component as the second component moves along the jounce axis toward the first component. The bumper is compressible between the first and second components for limiting jounce with the bumper radially expandable as the bumper is compressed. The outer member is disposed about the bumper and is capable of limiting the radial expansion of the bumper as the bumper is compressed for increasing a stiffness of the bumper. Increasing the stiffness of the bumper allows dual-rate jounce bumper assembly to absorb more energy generated by the second component moving toward the first component.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
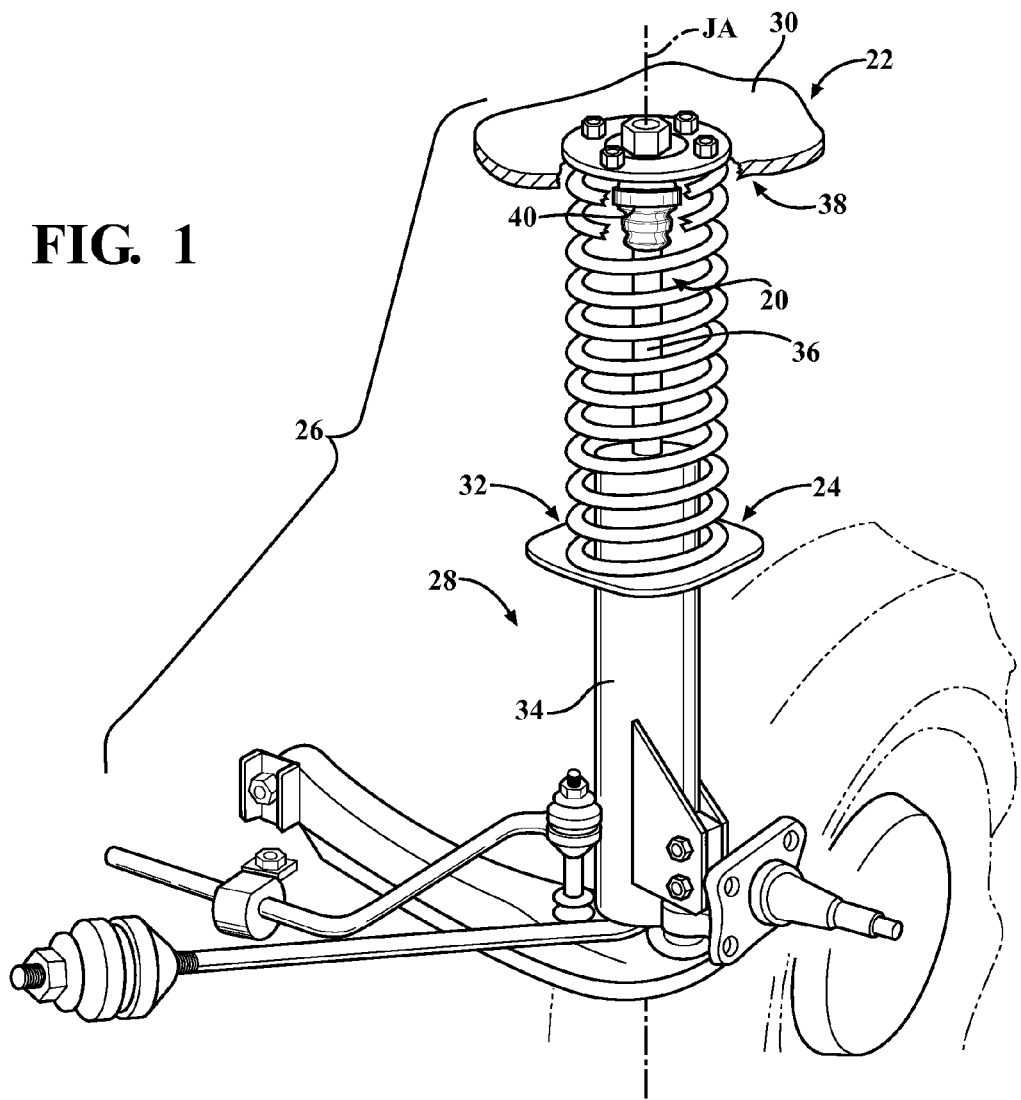
FIG. 1 is a perspective view of a suspension system of a vehicle including a dual-rate jounce bumper.

Referring to the Figures, wherein like numerals indicate like or corresponding parts throughout the several views, a dual-rate jounce bumper 20 is generally shown at 20. Generally, the dual-rate jounce bumper 20 limits jounce travel between a first component 22 and a second component 24 of a vehicle 26 wherein the second component 24 is spaced from and moveable toward the first component 22 along a jounce axis JA. For example, the dual-rate jounce bumper 20 may be used with a suspension system 28 of a vehicle 26 to limit movement of the suspension system 28 towards a frame member 30 of the vehicle 26. In such an example, limiting the jounce between the suspension system 28 and the frame member 30 of the vehicle 26 limits and/or prevents transmission of an impact force experienced by the suspension system 28, such as when the vehicle 26 travels over a bump, to the frame member 30. Said differently, the dual-rate jounce bumper 20 provides a cushion between elements of the suspension system 28 and the frame member 30 by gradually stiffen the suspension system 28 as the suspension system 28 approaches an end of its maximum jounce travel, i.e., before elements of the suspension system 28 contact the frame member 30 of the vehicle 26.

With reference to FIG. 1, generally, the dual-rate jounce bumper 20 is in alignment with the jounce axis JA to ensure the second component 24 contacts the dual-rate jounce bumper 20 as the second component 24 moves towards the first component 22 to limit jounce. When the second component 24 is the suspension system 28 of the vehicle 26, the dual-rate jounce bumper 20 is disposed between elements of the suspension system 28, such as a strut assembly 32, and the frame member 30 of the vehicle 26 thereby separating the elements of the suspension system 28 and the frame member 30. By separating the elements of the suspension system 28 and the frame member 30, the dual-rate jounce bumper 20 prevents the components of the suspension system 28 from directly impacting the frame member 30 as the suspension system 28 absorbs the energy generated by the impact force.

As shown in FIG. 1, the second component 24 is the strut assembly 32, which comprises a cylinder 34 and a piston rod 36 displaceable relative to the cylinder 34 along the jounce axis JA. An end 38 of the piston rod 36 is coupled to the first component 22, which in this case is the frame member 30, for coupling the suspension system 28 to the frame member 30 of the vehicle 26. It is to be appreciated that although not shown, the dual-rate jounce bumper 20 may be disposed between any elements of the vehicle 26.

Figure 2:
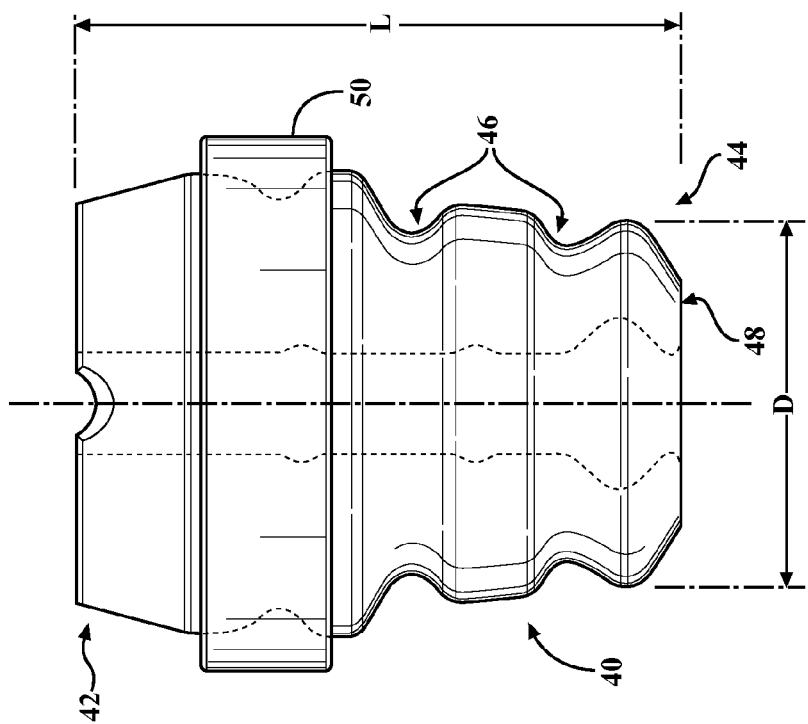
FIG. 2 is a front view of the dual-rate jounce bumper having an outer member disposed on a bumper.

As best shown in FIGS. 2, the dual-rate jounce bumper 20 includes a bumper 40. Generally, the bumper 40 has a cylindrical configuration. However, is it to be appreciated that the bumper 40 can be of any suitable configuration. A diameter D of the bumper 40 may vary along a length L of the bumper 40.

Figure 3:
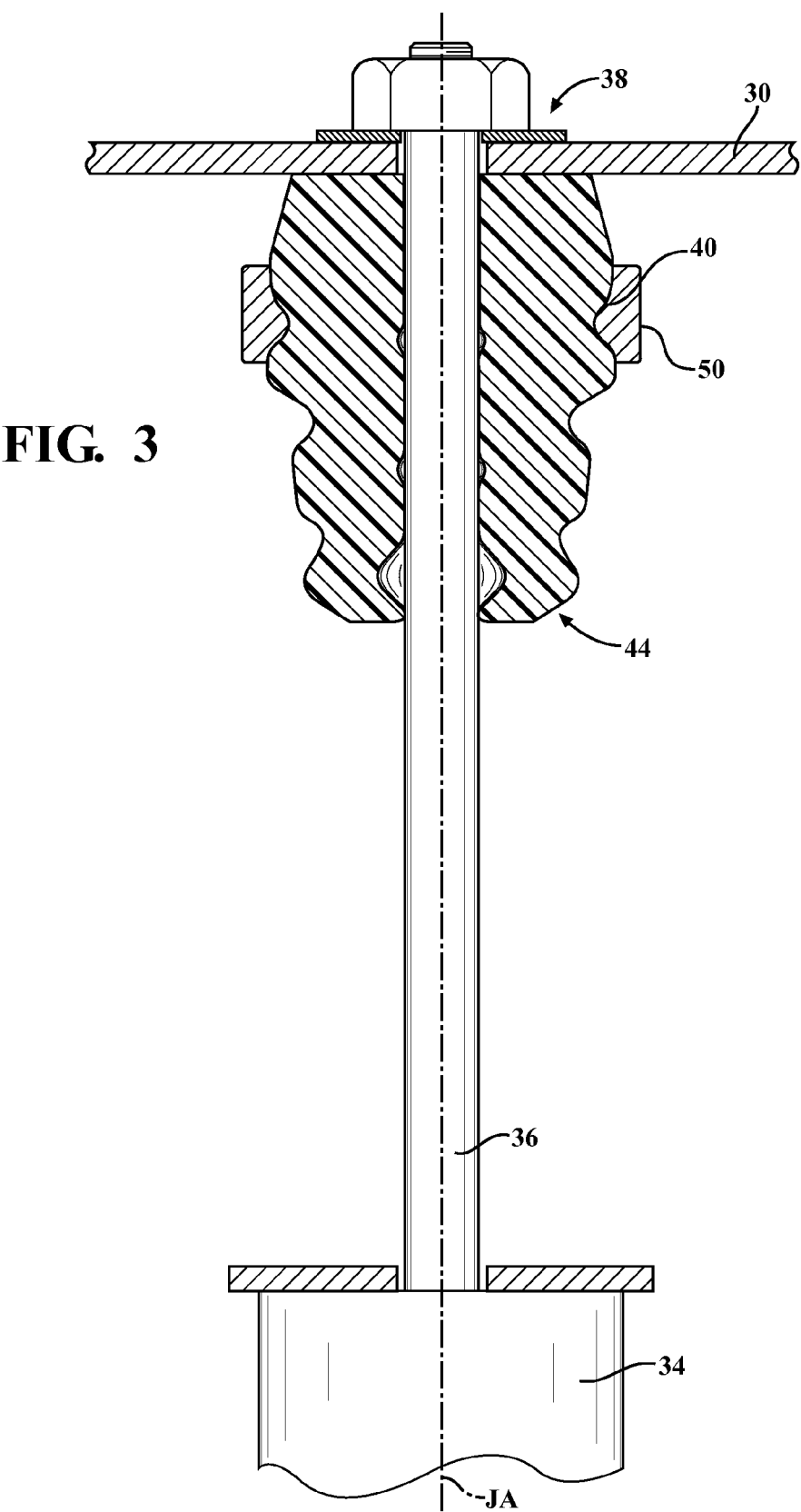
FIG. 3 is a cross-sectional view of a portion of the suspension system taken through the dual-rate jounce bumper coupled to a first component and with a second component spaced from the bumper.

With reference to FIG. 3, the bumper 40 has a first end 42 and a second end 44 spaced from the first end 42. Typically, the first end 42 of the bumper 40 is coupled to the first component 22 with the second end 44 contacting the second component 24 as the second component 24 moves along the jounce axis JA toward the first component 22. However, it is to be appreciated that the first end 42 of the bumper 40 may be coupled to the second component 24, such that the bumper 40 moves with the second component 24 along the jounce axis. In such an embodiment, the second end 44 of the bumper 40 would contact the first component 22.

Generally, the second component 24 moves toward the first component 22 as the result of a force being applied to the second component 24. The bumper 40 is disposed between the first and second components 22, 24 for limiting jounce of the second component 24 along the jounce axis JA as a result of the force applied on the second component 24. Said differently, the bumper 40 prevents direct contact between the first and second components 22, 24.

The bumper 40 is compressible between the first and second components 22, 24 to limit jounce of the second component 24 along the jounce axis JA. Therefore, the bumper 40 may comprise a material that is resilient, i.e., material that is able to spring back to shape after being compressed. For example, the material of the bumper 40 may be microcellular urethane, rubber, and combinations thereof.

As the bumper 40 is compressed, movement of the second component 24 along the jounce axis JA is resisted, which limits jounce. Additionally, the compression of the bumper 40 absorbs some, if not all, of the energy applied to the second component 24 thereby preventing the second component 24 from contacting the first component 22. The bumper 40 dampens the force acting on the second component 24 until the bumper 40 reaches a maximum compression. Once the bumper 40 reaches a maximum compression, the remaining force is transferred to the first component 22.

It is to be appreciated that the bumper 40 may define at least one groove 46 for controlling movement of the bumper 40 as the bumper 40 is compressed. The groove 46 may also reduce a stiffness of the bumper 40 at the location of the groove 46 for controlling the compression of the bumper 40. Additionally, the groove 46 may allow the bumper 40 to be compressed along the jounce axis JA. More specifically, the groove 46 allows the bumper 40 to be compressed uniformly along the jounce axis JA. The groove 46 also minimizes lateral expansion of the bumper 40 when the bumper 40 is compressed.

Figure 4:
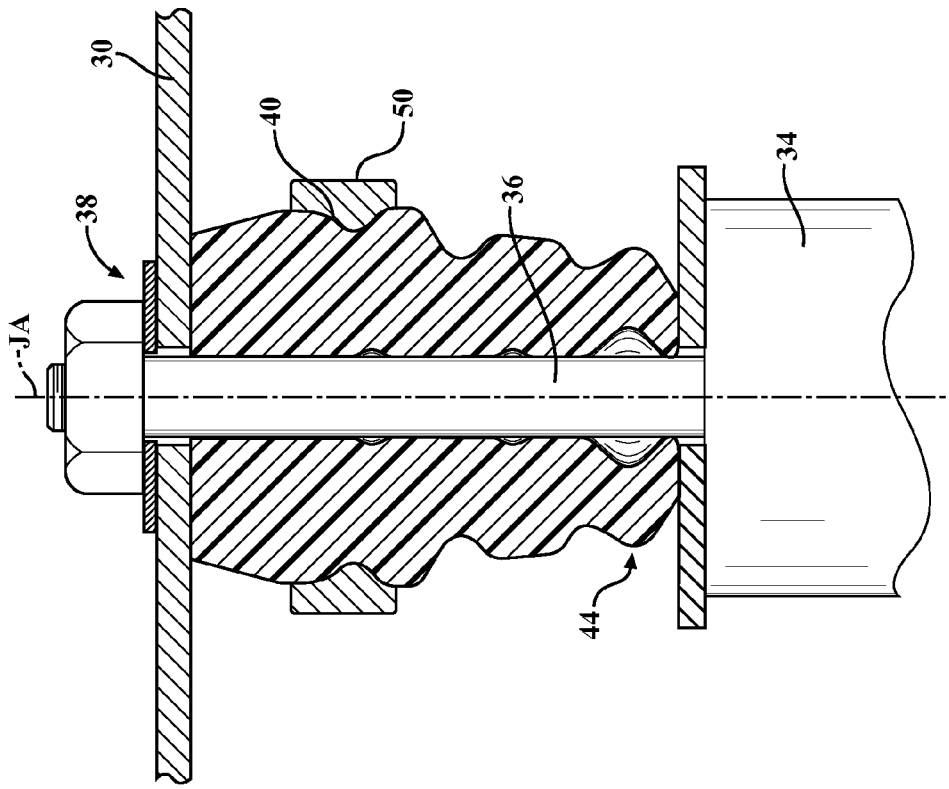
FIG. 4 is a cross-sectional view of a portion of the suspension system taken through the dual-rate jounce bumper with the second component contacting the bumper.
Figure 5:
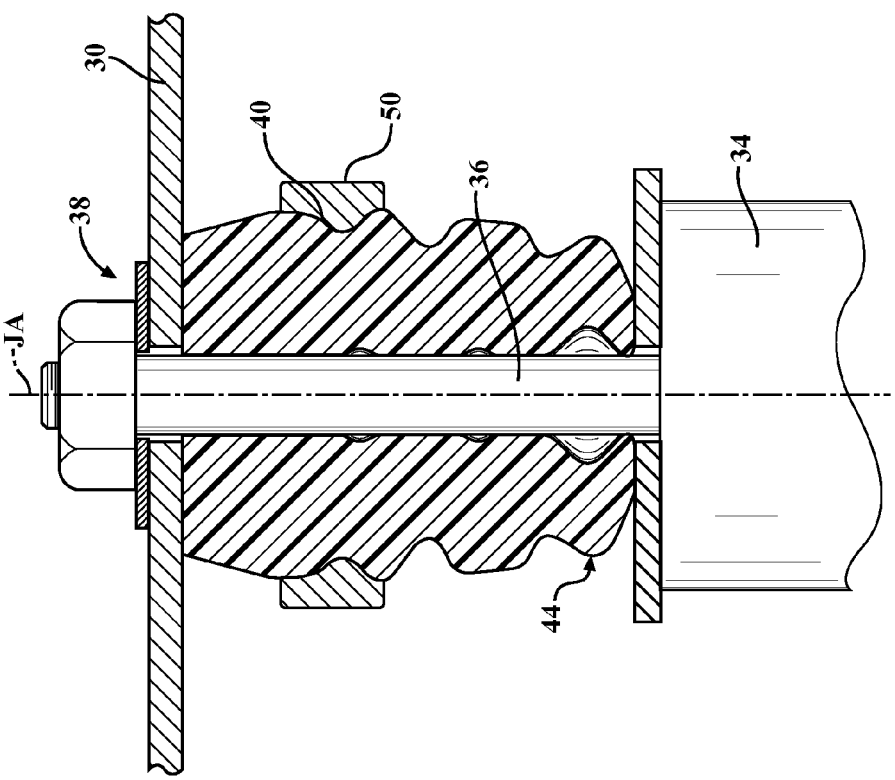
FIG. 5 is a cross-sectional view of a portion of the suspension system taken through the dual-rate jounce bumper with the second component compressing the bumper such that the bumper expands radially.

As shown in FIGS. 3-6, the first component 22 may be the frame member 30 of the vehicle 26 and the second component 24 may be the suspension system 28 of the vehicle 26. In such an embodiment, the dual-rate jounce bumper 20 may be coupled to the frame member 30 such that the dual-rate jounce bumper 20 remains stationary and the cylinder 34 moves into contact with the dual-rate jounce bumper 20, as shown in FIGS. 4 and 5. Alternatively, it is to be appreciated that the dual-rate jounce bumper 20 may be coupled to the cylinder 34 of the strut assembly 32 such that the dual-rate jounce bumper 20 moves with the cylinder 34.

Additionally, the force on the second component 24 may be the impact force generated in the suspension system 28 as the vehicle 26 travels over a bump. If the impact force is greater than the suspension system 28 can dampen, the components of the suspension system 28, such as the strut assembly 32 contact and compresses the bumper 40. In such an embodiment, the bumper 40 may define a clearance hole 48 for receiving the piston rod 36 of the strut assembly 32 such that the piston rod 36 is disposed through the bumper 40 for disposing the bumper 40 between the cylinder 34 of the strut assembly 32 and the frame member 30 of the vehicle 26. Therefore, the cylinder 34 of the strut assembly 32 will contact the bumper 40 as the piston rod 36 collapses into the cylinder 34, thereby dampening the force acting on the strut assembly 32.

The dual-rate jounce bumper 20 includes an outer member 50. The outer member 50 is disposed about the bumper 40. As such, the outer member 50 may have a ring shaped configuration defining a hollow interior. The bumper 40 is disposed within the hollow interior of the outer member 50. It is to be appreciated that the bumper 40 may be held within the outer member 50 by any suitable methods.

As the bumper 40 is compressed, the bumper 40 radially expands. Eventually, the bumper 40 reaches a maximum compression and thus a maximum radial expansion. The outer member 50 is capable of limiting the radial expansion of the bumper 40 as the bumper 40 is compressed. Limiting the radial expansion of the bumper 40 increases a stiffness of the bumper 40. Increasing the stiffness of the bumper 40 allows the dual-rate jounce bumper 20 to absorb more energy than bumpers with a lower stiffness.

Although the bumper 40 expands radially, it is to be appreciated that the outer member 50 may not be radially expandable relative to the bumper 40 thereby limiting the radial expansion of the bumper 40. Alternatively, the outer member 50 may be radially expandable relative to the bumper 40 while still limiting the radial expansion of the bumper 40. As such, the outer member 50 may have a stiffness that is different than the stiffness of the bumper 40. For example, the outer member 50 may have a stiffness that is greater than the stiffness of the bumper 40. Adjusting the stiffness of the outer member 50 controls the compression of the bumper 40. For example, the stiffness of the outer member 50 may be adjusted such that the bumper 40 is compressible to a predetermined value by the second member before the outer member 50 begins to radially expands. Said differently, the radial expansion of the bumper 40 and the outer member 50 may be two-staged, such that the bumper 40 is compressed and expands first and then the outer member 50 expands. For example, as the bumper 40 is compressed, the bumper 40 expands radially into the outer member 50. The outer member 50 may initially resist radial expansion which prevents further expansion of the bumper 40. Then, as the force continues to act on the bumper 40, the outer member 50 may begin to radially expand and the bumper 40 may continue to radially expand. The radial expansion of the outer member 50 allows the dual-stage dual-rate jounce bumper 20 to absorb more energy.

The outer member 50 typically comprises a thermoplastic material for allowing the outer member 50 to expand radially outward relative to the bumper 40. However, the outer member 50 may comprise any suitable material. When the outer member 50 comprises the thermoplastic material, the thermoplastic material is typically selected from the group of thermoplastic polyurethane, thermoplastic elastomer, thermoplastic olefin, and combinations thereof. An example of suitable thermoplastic materials for the outer member 50 is Elastollan® available from BASF Corporation.

Figure 6:
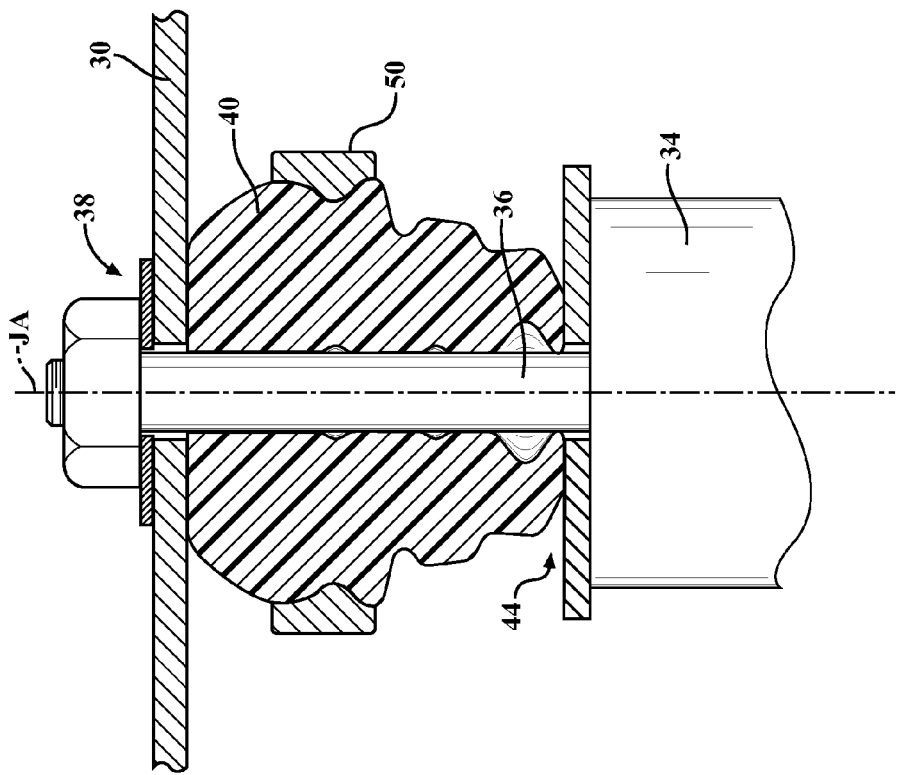
FIG. 6 is a cross-sectional view of a portion of the suspension system taken through the dual-rate jounce bumper with the second component further compressing the bumper such that both the bumper and the outer member expand radially.

When the first component 22 is the frame member 30 of the vehicle 26 and the second component 24 is the suspension system 28, the suspension system 28 receives the impact force. The impact force results in the cylinder 34 jouncing along the jounce axis JA. The cylinder 34 may impact the bumper 40 if the impact force is great enough, as shown in FIG. 4. For example, when the dual-rate jounce bumper 20 is coupled to the frame member 30 of the vehicle 26, the piston rod 36 collapses into the cylinder 34. As the piston rod 36 collapses, the cylinder 34 moves along the jounce axis JA toward the frame member 30 such that the bumper 40 contacts the frame member 30. As the cylinder 34 continues along the jounce axis JA, the bumper 40 is compressed, as shown in FIG. 5. As the bumper 40 is compressed, the bumper 50 expands radially, as shown in FIG. 5. If the bumper 40 is further compressed, the outer member 50 may also radially expand, as shown in FIG. 6.

The dual-rate jounce bumper 20 may be coupled to either the first or second 22, 24. Generally, the dual-rate jounce bumper 20 to be coupled to the vehicle 26. For example, dual-rate jounce bumper 20 may be connected to the strut assembly 32, and, more specifically, to the cylinder 34 of the strut assembly 32 for connecting the dual-rate jounce bumper 20 to the strut assembly 32. Because the strut assembly 32 is coupled to the frame member 30, connecting the dual-rate jounce bumper 20 to the cylinder 34 of the strut assembly 32 also connects the dual-rate jounce bumper 20 to the vehicle 26. However, it is to be appreciated that dual-rate jounce bumper 20 may be connected to the frame member 30 for connecting the dual-rate jounce bumper 20 to the vehicle 26.

It is to be appreciated that the outer member 50 may have different cross-sectional configurations for controlling radial expansion of the outer member 50. For example, the outer member 50 may have a concaved or a convex cross-sectional configuration for increasing or decreasing the resistance to radial expansion of the outer member 50. Controlling the radial expansion of the outer member 50 controls the expansion of the bumper 40 at the outer member 50.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A dual-rate jounce bumper for limiting jounce travel between a first component and a second component of a vehicle with the second component spaced from and moveable toward the first component along a jounce axis, said jounce bumper comprising:
   a bumper having a first end for coupling to the first component and having a second end spaced from said first end for contacting the second component with said bumper compressible between the first and second components for limiting jounce with said bumper radially expandable as said bumper is compressed; and
   an outer member disposed about said bumper and capable of limiting the radial expansion of said bumper as said bumper is compressed for increasing a stiffness of the bumper;
   wherein said outer member is also radially expandable as said bumper is compressed.

2. A dual-rate jounce bumper as set forth in claim 1 wherein said body of said outer member has a ring shaped configuration having a hollow interior with said bumper disposed within said hollow interior.

3. A dual-rate jounce bumper as set forth in claim 1 wherein said outer member has a stiffness that is greater than a stiffness of said bumper such that said bumper is compressible to a predetermined value by the second member before said outer member radially expands.

4. A dual-rate jounce bumper as set forth in claim 3 wherein said bumper comprises a microcellular urethane.

5. A dual-rate jounce bumper as set forth in claim 4 wherein said outer member comprises a thermoplastic material.

6. A dual-rate jounce bumper as set forth in claim 1 wherein said body of said outer member has a ring shaped configuration having a hollow interior with said bumper disposed within said hollow interior, and wherein said outer member has a stiffness that is greater than a stiffness of said bumper such that said bumper is compressible to a predetermined value by the second member before said outer member radially expands.

7. A dual-rate jounce bumper as set forth in claim 1 wherein said outer member comprises a thermoplastic material.

8. A dual-rate jounce bumper as set forth in claim 1 wherein said body of said outer member has a ring shaped configuration having a hollow interior with said bumper disposed within said hollow interior, and wherein said outer member comprises a thermoplastic material.

9. A dual-rate jounce bumper as set forth in claim 8 wherein said bumper comprises a microcellular urethane.

10. A vehicle comprising,
    a frame member having a first component;
    a suspension system having a second component; and
    a dual-rate jounce bumper comprising;
        a bumper having a first end for coupling to the first component and having a second end spaced from said first end for contacting the second component with said bumper compressible between the first and second components for limiting jounce with said bumper radially expandable as said bumper is compressed; and an outer member disposed about said bumper and capable of limiting the radial expansion of said bumper as said bumper is compressed for increasing a stiffness of the bumper;

wherein said outer member is also radially expandable as said bumper is compressed.

11. A vehicle as set forth in claim 10 wherein said body of said outer member of said dual-rate jounce bumper has a ring shaped configuration having a hollow interior with said bumper disposed within said hollow interior.

12. A vehicle as set forth in claim 10 wherein said outer member has a stiffness that is greater than a stiffness of said bumper such that said bumper is compressible to a predetermined value by the second member before said outer member radially expands.

13. A vehicle as set forth in claim 12 wherein said bumper comprises a microcellular urethane.

14. A vehicle as set forth in claim 13 wherein said outer member comprises a thermoplastic material.

15. A vehicle as set forth in claim 10 wherein said second component of said suspension system includes a strut assembly having a cylinder and a piston rod coupled to said frame member and displaceable relative to said cylinder along a jounce axis.

16. A vehicle as set forth in claim 15 wherein said bumper defines a clearance hole for receiving said piston rod such that said piston rod is disposed through said bumper with said bumper disposed between said cylinder and said frame member along said jounce axis.

17. A vehicle as set forth in claim 10 wherein said body of said outer member of said dual-rate jounce bumper has a ring shaped configuration having a hollow interior with said bumper disposed within said hollow interior, and wherein said outer member has a stiffness that is greater than a stiffness of said bumper such that said bumper is compressible to a predetermined value by the second member before said outer member radially expands.

18. A vehicle as set forth in claim 10 wherein said outer member comprises a thermoplastic material.

19. A vehicle as set forth in claim 10 wherein said body of said outer member of said dual-rate jounce bumper has a ring shaped configuration having a hollow interior with said bumper disposed within said hollow interior, and wherein said outer member comprises a thermoplastic material.

20. A vehicle as set forth in claim 19 wherein said bumper comprises a microcellular urethane.

* * * * *